US008417041B2

(12) United States Patent
Monaghan et al.

(10) Patent No.: US 8,417,041 B2
(45) Date of Patent: Apr. 9, 2013

(54) RESOLUTION INDEPENDENT IMAGE DEGRADATION

(75) Inventors: David Robert James Monaghan, Eastwood (AU); Ekaterina Stefanov, Normanhurst (AU)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 12/620,729

(22) Filed: Nov. 18, 2009

(65) Prior Publication Data

US 2010/0128979 A1     May 27, 2010

(30) Foreign Application Priority Data

Nov. 21, 2008  (AU) ................................ 2008249145

(51) Int. Cl.
*G06K 9/36*       (2006.01)
*G06K 9/46*       (2006.01)
*G06K 9/00*       (2006.01)
(52) U.S. Cl. ........................................ 382/232; 382/251
(58) Field of Classification Search .................. 382/232, 382/233, 235, 239, 251
See application file for complete search history.

(56) References Cited

U.S. PATENT DOCUMENTS

| | | | | |
|---|---|---|---|---|
| 5,473,376 A | * | 12/1995 | Auyeung ..................... 348/403.1 |
| 5,475,502 A | * | 12/1995 | Lee et al. ..................... 382/239 |
| 5,793,314 A | * | 8/1998 | Auyeung ..................... 341/51 |
| 6,463,177 B1 | | 10/2002 | Li et al. ..................... 382/232 |
| 6,937,770 B1 | * | 8/2005 | Oguz et al. ..................... 382/235 |
| 7,106,909 B2 | * | 9/2006 | Satoh et al. ..................... 382/239 |
| 7,136,531 B2 | * | 11/2006 | Satoh ..................... 382/232 |
| 2003/0152278 A1 | * | 8/2003 | Temizel et al. ............... 382/233 |
| 2004/0190791 A1 | * | 9/2004 | Oyabu et al. .................. 382/298 |
| 2005/0041874 A1 | * | 2/2005 | Langelaar et al. ............. 382/233 |
| 2005/0163214 A1 | * | 7/2005 | Yachida ..................... 375/240.03 |
| 2008/0144952 A1 | * | 6/2008 | Chen et al. ..................... 382/239 |
| 2009/0154818 A1 | | 6/2009 | Stefanov et al. .............. 382/239 |
| 2009/0161973 A1 | | 6/2009 | Stefanov et al. .............. 382/246 |

FOREIGN PATENT DOCUMENTS

| | | |
|---|---|---|
| AU | 2005239671 A1 | 6/2007 |
| EP | 0 712 251 A2 | 5/1996 |

* cited by examiner

*Primary Examiner* — Bernard Krasnic
(74) *Attorney, Agent, or Firm* — Fitzpatrick, Cella, Harper & Scinto

(57) ABSTRACT

The disclosure relates to an image processing system of encoding spectral coefficients of an image. According to the disclosure, the spectral coefficients of the image are received, the spectral coefficients being quantized, and a scaling factor to be applied to the image for rendering a bitmap of the image after decoding is received. The received spectral coefficients are partitioned into a plurality of groupings, wherein a number of coefficients in each of the groupings is determined based on the scaling factor for rendering the bitmap of the image. The spectral coefficients in each of the plurality of groupings are encoded, and the plurality of groupings of encoded spectral coefficients are transmitted to a decoder.

12 Claims, 16 Drawing Sheets

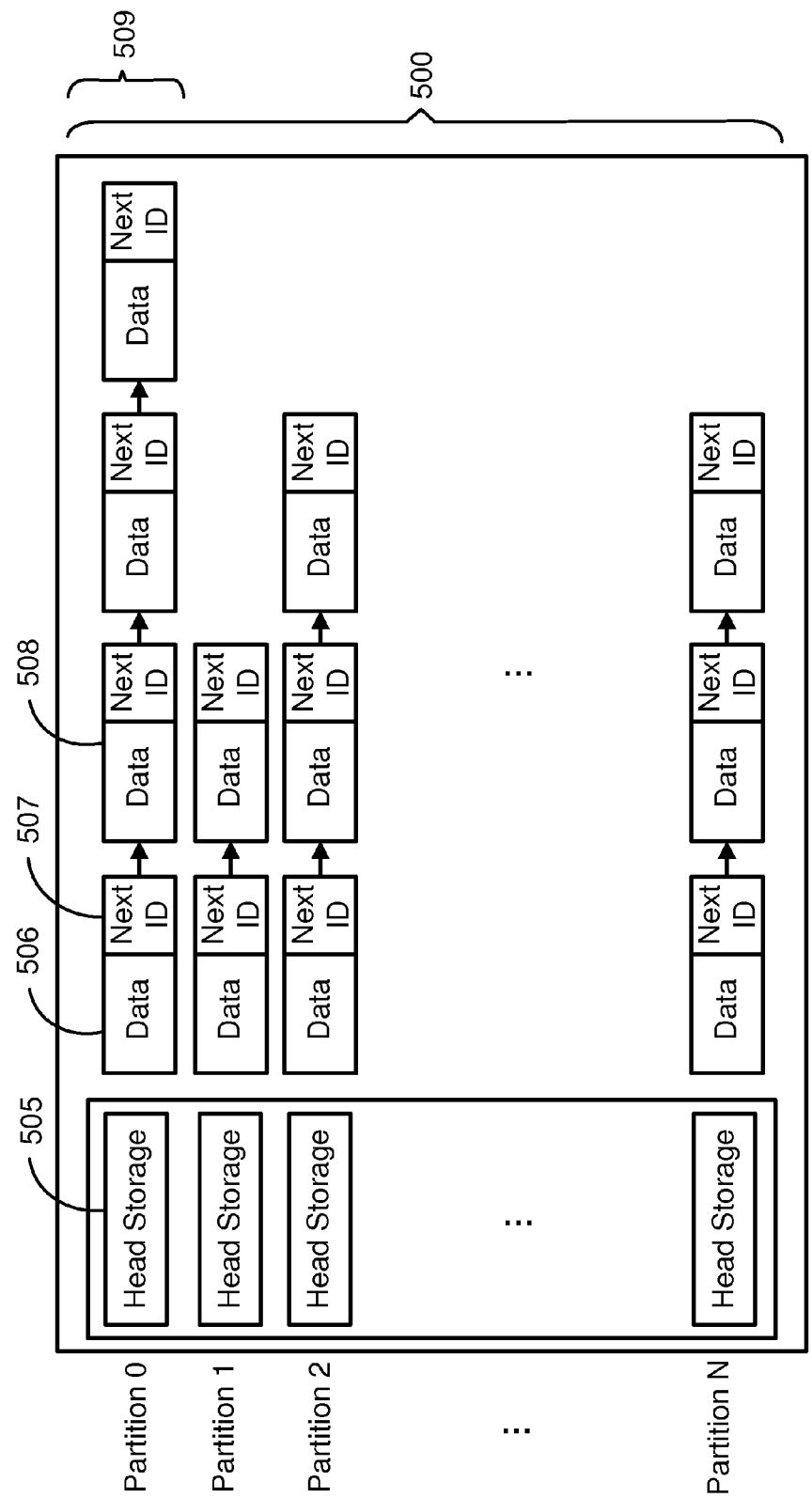

RESOLUTION INDEPENDENT IMAGE DEGRADATION

FIELD OF INVENTION

The present invention relates to image processing and, in particular, to a method and apparatus for storing a bitmap. Such a bitmap may also be referred to as a bitmap image. The present invention also relates to a computer program product including a computer readable medium having recorded thereon a computer program for storing a bitmap.

DESCRIPTION OF BACKGROUND ART

Many computer systems are required to process large amounts of image or bitmap data. Such computer systems are frequently operating with restricted memory resources, and as such, these computer systems often compress bitmap data to reduce the amount of memory required during processing of the bitmap data.

There are many conventional compression methods that may be applied to bitmap data. The compression method used for particular bitmap data often depends on the attributes of the bitmap data. Some conventional image compression methods use parameters to control how aggressively to compress particular bitmap data. The more aggressive a compression method, the more information is lost to achieve a desired compression ratio. For example, the Joint Photographic Expert Group (JPEG) compression method uses quantisation tables to control how much perceptual information is lost during the compression of a given image.

Typically, the size of uncompressed bitmap data representing an image is used to determine whether the image will be compressed, and if so, to select a compression method and associated parameters to be used to compress the image. If not specified, the size of uncompressed bitmap data representing an image may be determined using the dimensions of the image (i.e., width and height) in pixels and the number of bits per pixel (bpp). The number of bits per pixel is often referred to as the colour depth or bit depth.

Other image attributes may be used in determining which image compression method to use to compress bitmap data representing an image. Such other image attributes include the type of content (e.g., line art or photographic), rendering target (e.g. screen or printer), and rendering colour space. However, in many instances such other image attributes are not known at the time of compression of particular bitmap data. For example, a streamed data interface often provides very little information about an image represented by streamed bitmap data prior to transferring the bitmap data itself.

A streamed data interface is one in which each individual piece of a particular portion of streamed data is presented to the interface once and only once. Data is presented to a streamed data interface in an order defined either by external or otherwise predetermined constraints. As a result, a computer system receiving bitmap data via such a streamed data interface cannot look ahead in a data stream. Such a computer system must accept data as data is received.

In addition, most streamed data interfaces cannot re-send data once the data has been transferred. An example of such a streamed data interface is a network connection between a desktop personal computer (PC) and a printer, in which the printer receives streamed printing commands and rendering data from the personal computer. However, such streamed data interfaces typically provide width, height and bit depth values for an image prior to transferring bitmap data representing the image. The provision of such width, height and bit depth values allow a computer system receiving such bitmap data to choose a compression method based on the size of the uncompressed bitmap data, and to compress data accordingly as the data is received.

A further difficulty is encountered when determining the compression method parameters if the bitmap data needs to be scaled during the final page render. Depending on the method of interpolation used in final render the 'quality' of the final image can vary. This difficulty is compounded if the bitmap data representing an image is further reduced in quality during job generation and there are multiple images on the same page.

In one known data compression method, after having been compressed by a first compression scheme that provides quantized transform coefficients, digital information is partially decompressed to recover transform coefficients as the transform coefficients were prior to quantizing. The transform coefficients are then re-quantized at a different compression level. The previously compressed digital information is only partially decompressed and re-quantized to modify its compression level. However, such a method is inefficient due to the need to decompress and then recompress data.

In one known storage method, images are stored (predominantly in a camera) so that they can be dynamically reduced in quality to free space for further images to be stored. Thus, in such a method, there is a trade off between number of stored images and quality. Images are encoded so the images can be truncated at arbitrary locations and the size and hence quality of an image can be reduced without needing to decode and re-encode. A user can select (on an image by image basis) a level to which the image can be truncated. Non-selected images are then truncated to make room for further images. A second threshold can also be set to ensure images retain a minimum level of quality. However, quality of truncated images is inconsistent.

A method of recovering memory in a rendering system with limited memory resources, is also known. In this method, an image compressor stores image data in a series of layers, each layer being responsible for a certain level of visual quality. Compression can be increased efficiently, without re-compression, by discarding the layers containing the least visually significant information. Images are initially stored at maximum quality and are gradually degraded as necessary releasing enough memory for the rendering system to function, and only up to a maximum acceptable compression level in order to prevent severe visual degradation. In accordance with this known memory recovery method, in a system where several display lists are maintained at any one time, a compression level value is associated with each of them. Image data is removed from image(s) from display lists with lowest compression level value. All images in a display list are compressed to the compression level of the display list, expect for images shared between display lists in which case, the higher compression level applies to that image.

SUMMARY OF THE INVENTION

It is an object of the present invention to substantially overcome, or at least ameliorate, one or more disadvantages of existing arrangements.

According to one aspect of the present invention there is provided a method of encoding spectral coefficients of an image, said method comprising the steps of:

determining a scaling factor to be applied to the image after decoding;

determining a range of spectral coefficients in a grouping based on said scaling factor; and encoding the spectral coefficients; and transmitting the encoded spectral coefficients in a predetermined number of groupings to the decoder.

According to another aspect of the present invention there is provided an apparatus for encoding spectral coefficients of an image, said apparatus comprising:

means for determining a scaling factor to be applied to the image after decoding;

means for determining a range of spectral coefficients in a grouping based on said scaling factor; and means for encoding the spectral coefficients; and means for transmitting the encoded spectral coefficients in a predetermined number of groupings to the decoder.

According to still another aspect of the present invention there is provided a system for encoding spectral coefficients of an image, said system comprising:

a memory for storing data and a computer program; and a processor coupled to said memory executing said computer program, said computer program comprising instructions for:

determining a scaling factor to be applied to the image after decoding;

determining a range of spectral coefficients in a grouping based on said scaling factor; and encoding the spectral coefficients; and transmitting the encoded spectral coefficients in a predetermined number of groupings to the decoder.

According to still another aspect of the present invention there is provided a computer readable medium, having a program recorded thereon, where the program is configured to make a computer execute a procedure to encode spectral coefficients of an image, said program comprising:

code for determining a scaling factor to be applied to the image after decoding;

code for determining a range of spectral coefficients in a grouping based on said scaling factor; and code for encoding the spectral coefficients; and code for transmitting the encoded spectral coefficients in a predetermined number of groupings to the decoder.

According to still another aspect of the present invention there is provided a method of recovering memory on a system, said method comprising the steps of:

encoding one or more different bitmaps into separate encoded bitstreams;

determining a number of encoded bitstreams that applies to all previously stored bitmaps, upon the resources of the system being exhausted; and deleting bitstreams from the previously stored bitmaps up to the determined number, to recover memory on the system.

According to still another aspect of the present invention there is provided an apparatus for recovering memory on a system, said apparatus comprising:

means for encoding one or more different bitmaps into separate encoded bitstreams;

means for determining a number of encoded bitstreams that applies to all previously stored bitmaps, upon the resources of the system being exhausted; and means for deleting bitstreams from the previously stored bitmaps up to the determined number, to recover memory on the system.

According to still another aspect of the present invention there is provided a system for recovering memory on a printing system, said system comprising a memory for storing data and a computer program; and a processor coupled to said memory executing said computer program, said computer program comprising instructions for:

encoding one or more different bitmaps into separate encoded bitstreams; determining a number of encoded bitstreams that applies to all previously stored bitmaps, upon the resources of the system being exhausted; and deleting bitstreams from the previously stored bitmaps up to the determined number, to recover memory on the system.

According to still another aspect of the present invention there is provided a computer readable medium, having a program recorded thereon, where the program is configured to make a computer execute a procedure to recover memory on a system, said program comprising:

code for encoding one or more different bitmaps into separate encoded bitstreams;

code for determining a number of encoded bitstreams that applies to all previously stored bitmaps, upon the resources of the system being exhausted; and code for deleting bitstreams from the previously stored bitmaps up to the determined number, to recover memory on the system.

Other aspects of the invention are also disclosed.

BRIEF DESCRIPTION OF THE DRAWINGS

One or more embodiments of the invention will now be described with reference to the following drawings, in which:

FIG. 5 shows a schematic block diagram of an arrangement of partitions in memory in a compressed bitmap data buffer;

FIG. 6b shows a schematic block diagram of a typical arrangement of memory partitions corresponding to the three bitmaps referred to in FIG. 6a;

FIG. 9b shows a graph of the discrete cosine transform of the signal in FIG. 9a;

DETAILED DESCRIPTION OF EMBODIMENTS OF THE INVENTION

Figure 1A:
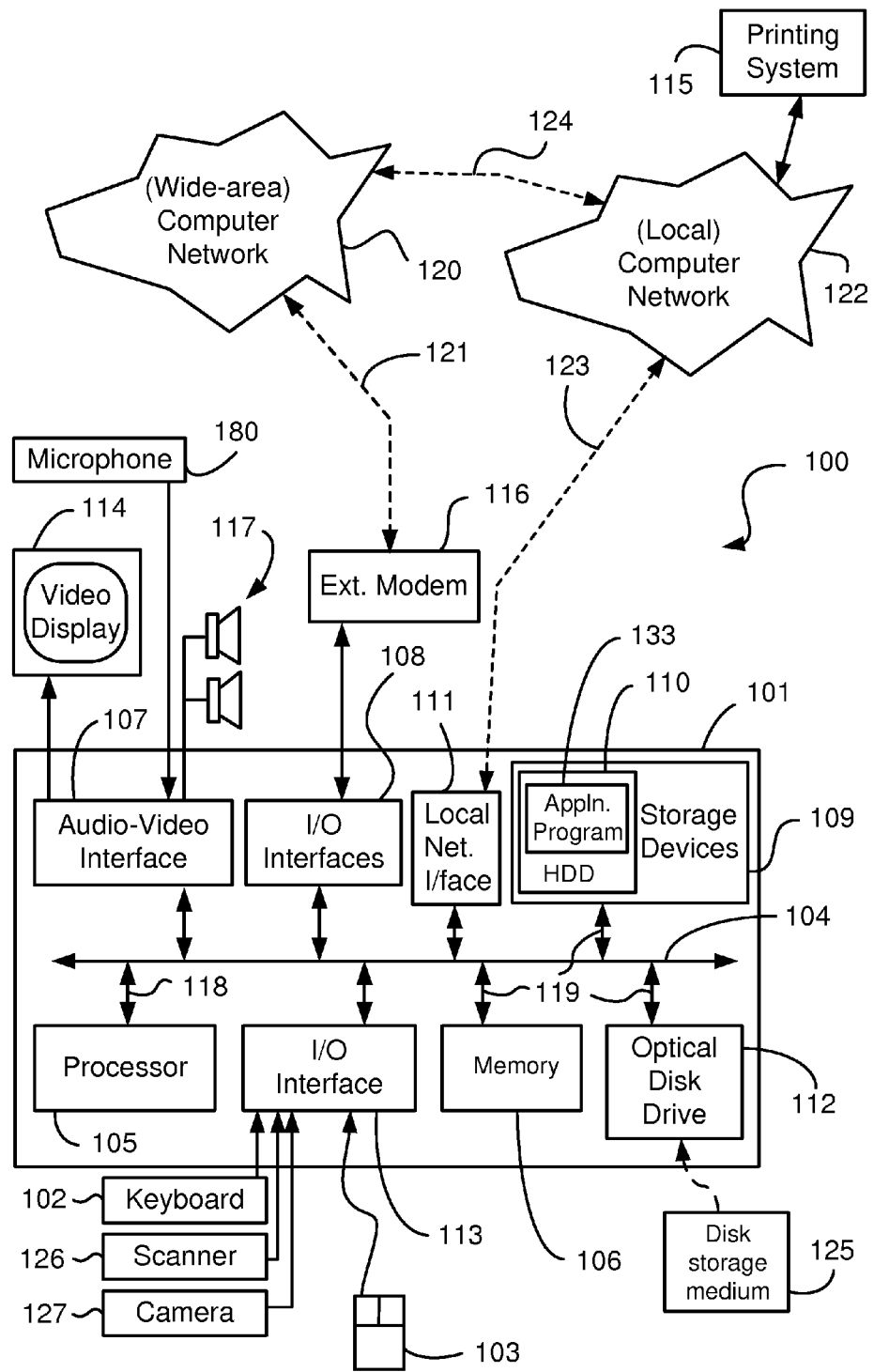
FIGS. 1A to 1C collectively form a schematic block diagram of a pixel rendering system, upon which the various arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

The principles of the arrangements described herein have general applicability to bitmap compression (or encoding). Such a bitmap may also be referred to as a "bitmap image". For ease of explanation the arrangements are described with reference to bitmap compression used in a colour raster bitmap processing system. However, it is not intended that the present invention be limited to the described arrangements. For example, the invention may have application to any arrangement utilising compression where memory resources are limited.

Bitmap data representing an image is described below as a two dimensional (2D) sequence of pixel values x[n,m], having finite extents in the horizontal and vertical directions, n, m, referring to horizontal and vertical index positions of the pixel values. Pixel values are represented by three channels representing a red component (R), a green component (G), and a blue component (B) (referred to as RGB) with eight (8) bits of precision per channel (referred to as bit depth). Other colour representations such as one cyan, one magenta, one yellow and one black channel (referred to as CMYK) may also be utilised, along with other bit depths.

A pixel value may also be an indirect reference that can be used to generate a colour value. For example, a pixel value may be an index to a palette containing sets of one or more colours to be composited to generate the colour value. Throughout this description, colour at a pixel should be taken to include such indirect references to colour.

As described below, to achieve consistent quality reduction across all images, a lossy compression method may be used to compress (or encode) images and separately partition compressed bitmap data for an image into most visually perceptible to least visually perceptible elements. This partitioning allows compressed bitmap data to be deleted, generally beginning with least visually perceptible elements and continuing to a predetermined threshold representing the minimum image quality allowable.

By deleting the least visually perceptible elements, memory is made available for use by a remaining portion of a page, for example, in a way that maximises the quality of the decompressed pixels. This partitioning is arranged so bitmaps that require different amounts of scaling for final rendering remain at the same level of visual significance. Each partition contains one or more compressed bitstreams representing the bitmap data dependent on a final scale factor of the individual bitmaps. In such an arrangement, it is possible to uniformly degrade quality across portions (preferably the whole) of the page by deleting such partitions in ascending order of visual significance.

Figure 1B:
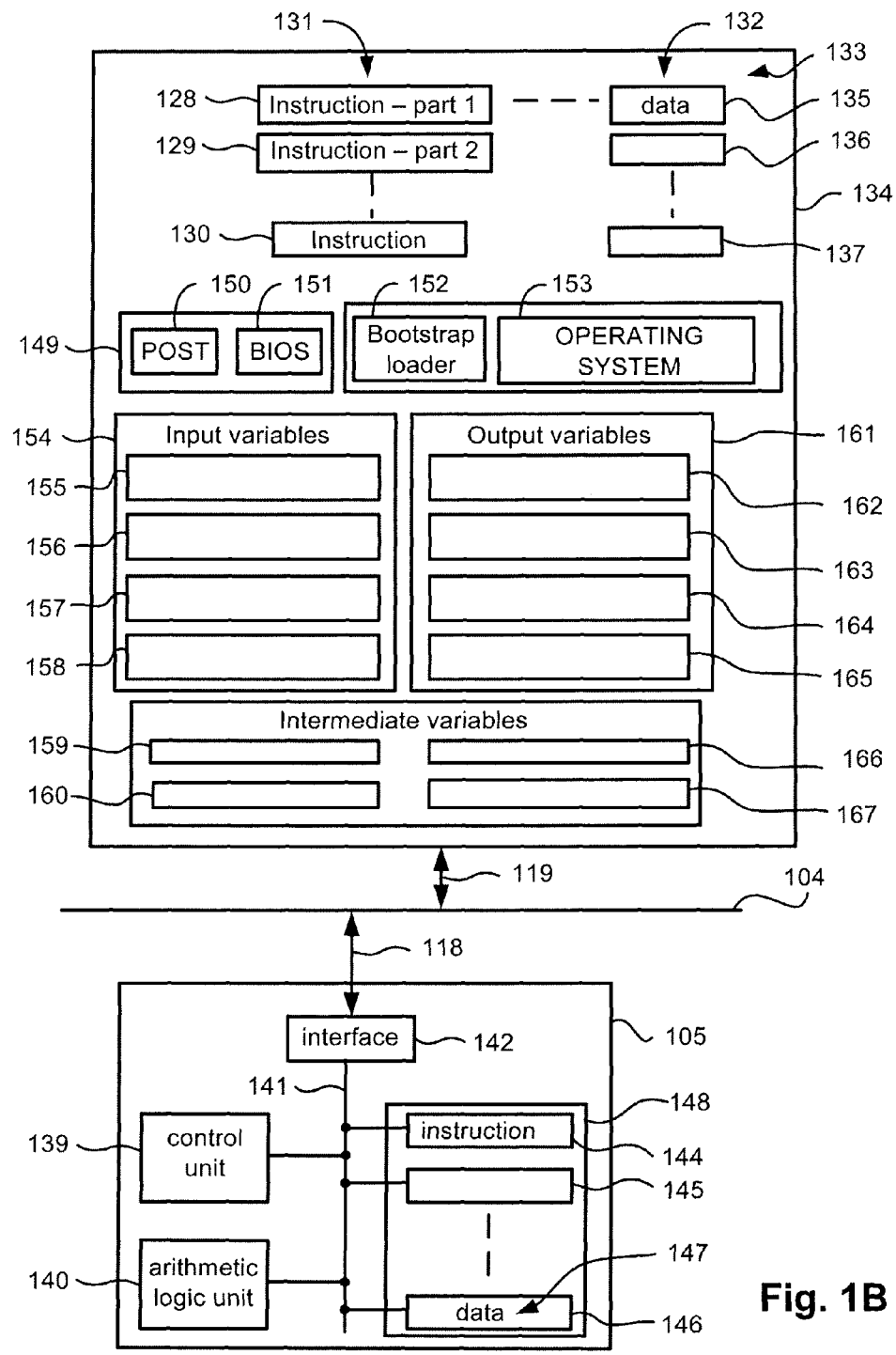
Figure 1C:
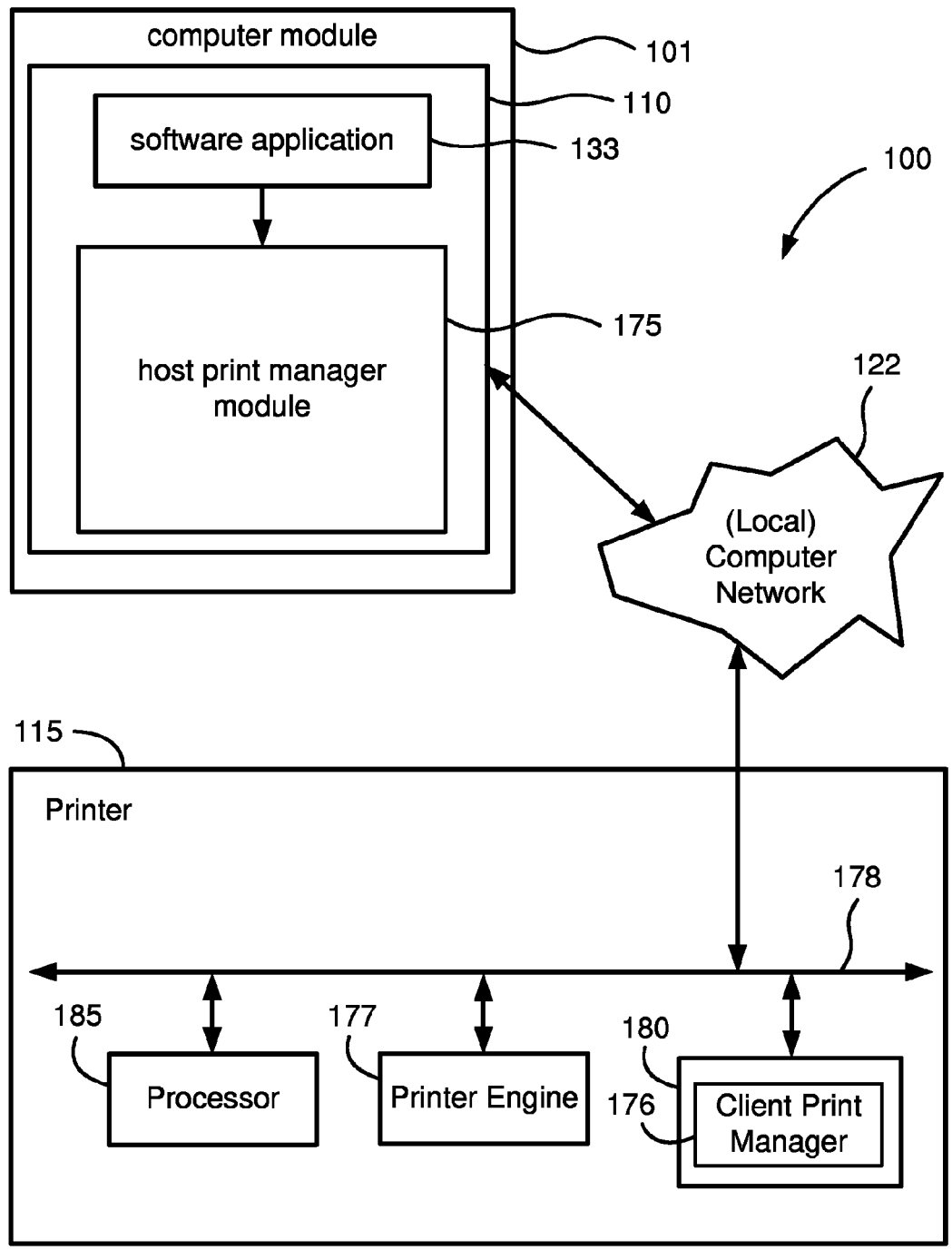

FIGS. 1A to 1C collectively form a schematic block diagram of a pixel rendering system 100, upon which the various arrangements described can be practiced.

As seen in FIG. 1A, the system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes a number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116. In some implementations, the modem 116 may be incorporated within the computer module 101, for example within the interface 108. The computer module 101 also has a local network interface 111 which, via a connection 123, permits coupling of the pixel rendering system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arranegment or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104. Examples of computers on which the described arrangements can be practiced include IBM-PC's and compatibles, Sun Sparcstations, Apple Mac™ or alike computer systems evolved therefrom.

Methods described below may be implemented using the system 100 wherein the processes of FIGS. 2 to 10, to be described, may be implemented as one or more software application programs 133 executable within the system 100. In particular, the steps of the described methods are effected by instructions 131 in the software that are carried out within the system 100. The software instructions 131 may be formed as one or more software code modules, each for performing one or more particular tasks. The software may also be divided into two separate parts, in which a first part and the corresponding software code modules performs the described methods and a second part and the corresponding software code modules manage a user interface between the first part and the user.

The software may be stored in a computer readable medium, including the storage devices described below, for example. The software is loaded into the system 100 from the computer readable medium, and then executed by the system 100. A computer readable medium having such software or computer program recorded on it is a computer program product. The use of the computer program product in the system 100 preferably effects an advantageous apparatus for implementing the described methods.

The software 133 is typically stored in the HDD 110 or the memory 106. The software is loaded into the system 100 from a computer readable medium, and then executed by the system 100. Thus for example the software may be stored on an optically readable CD-ROM medium 125 that is read by the optical disk drive 112. A computer readable medium having such software or computer program recorded on it is a computer program product. The use of the computer program product in the computer system 100 preferably effects an advantageous apparatus for implementing the described methods.

In some instances, the application programs 133 may be supplied to the user encoded on one or more CD-ROM 125 and read via the corresponding drive 112, or alternatively may be read by the user from the networks 120 or 122. Still further, the software can also be loaded into the system 100 from other computer readable media. Computer readable storage media refers to any storage medium that participates in providing instructions and/or data to the system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfill various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118 and connections 119.

The application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The described methods use input variables 154 that are stored in the memory 134 in corresponding memory locations 155-158. The described methods produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 4:
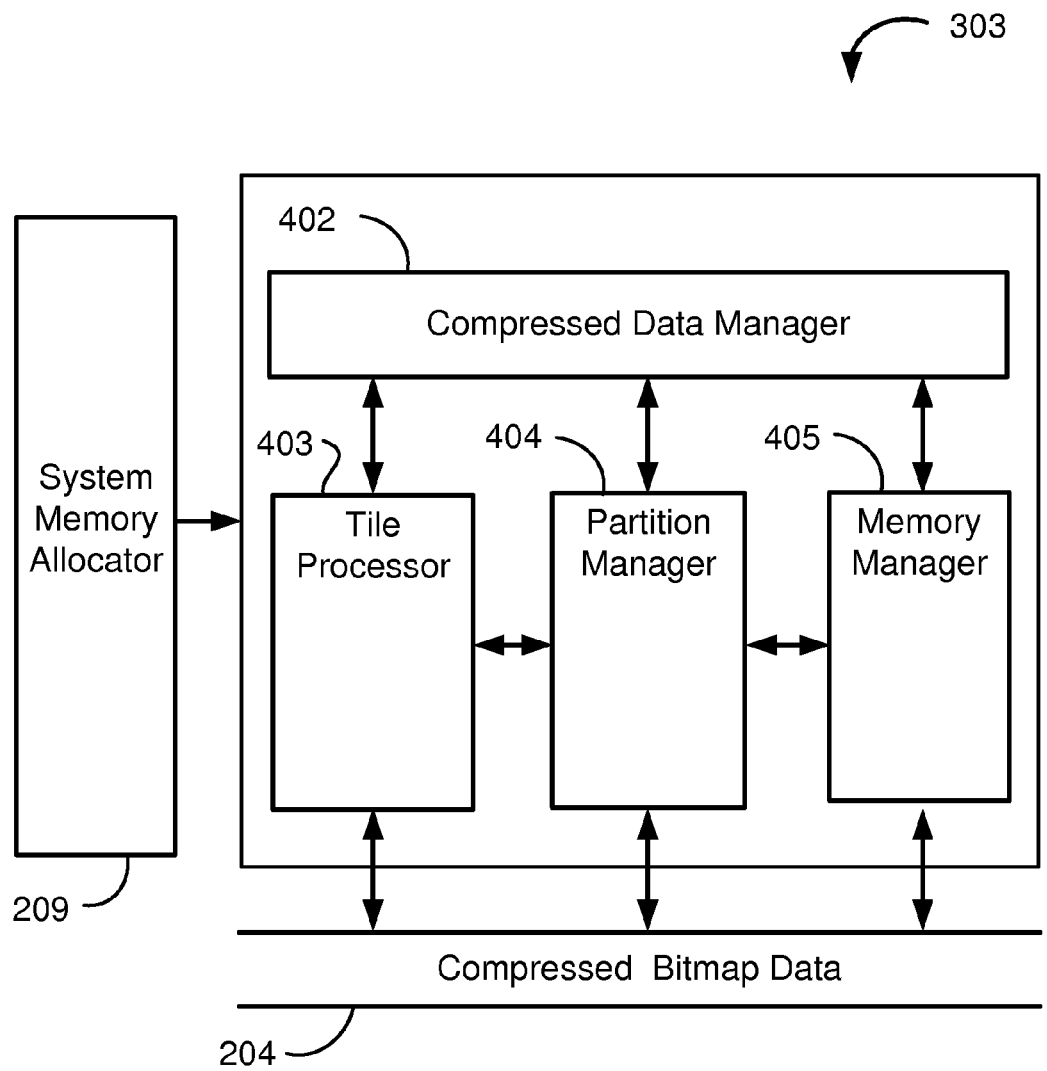
FIG. 4 is a schematic block diagram of a compressed data memory manager.

Each step or sub-process in the processes of FIGS. 4 to 6 is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the methods. Such dedicated hardware may include graphic processors, digital signal processors, or one or more microprocessors and associated memories.

FIG. 1C shows the computer module 101 connected to the printer 115 via the network 122. The printer 115 comprises at least one processor unit 185 and a memory unit 180. The printer 115 further comprises a printer engine 177. The components 185, 180 and 177 are coupled via a communications bus 178.

When a user of the computer module 101 chooses to print a document to a physical medium using the printer 115, there are a number of stages in the process. The software application 133 executing on the computer module 101 generates data in the form of a page description language (PDL), such as Adobe® PostScript® or Hewlett-Packard's Printer Command Language (PCL), which describes objects to be printed. For example, a bitmap to be to be rendered and printed has an associated PDL representation. A host print manager module 175 also being executed by the processor 105 on the computer module 101 processes the PDL representation, before transmitting resulting data from the via the network 122 to the printer 115.

A client print manager module 176, resident in the memory 180 and being controlled in its execution by the processor 185 of the printer 115, performs further processing before the resulting data is provided to the printer engine 177 of the printer 115 where the resulting data is printed on a physical medium.

Figure 2:
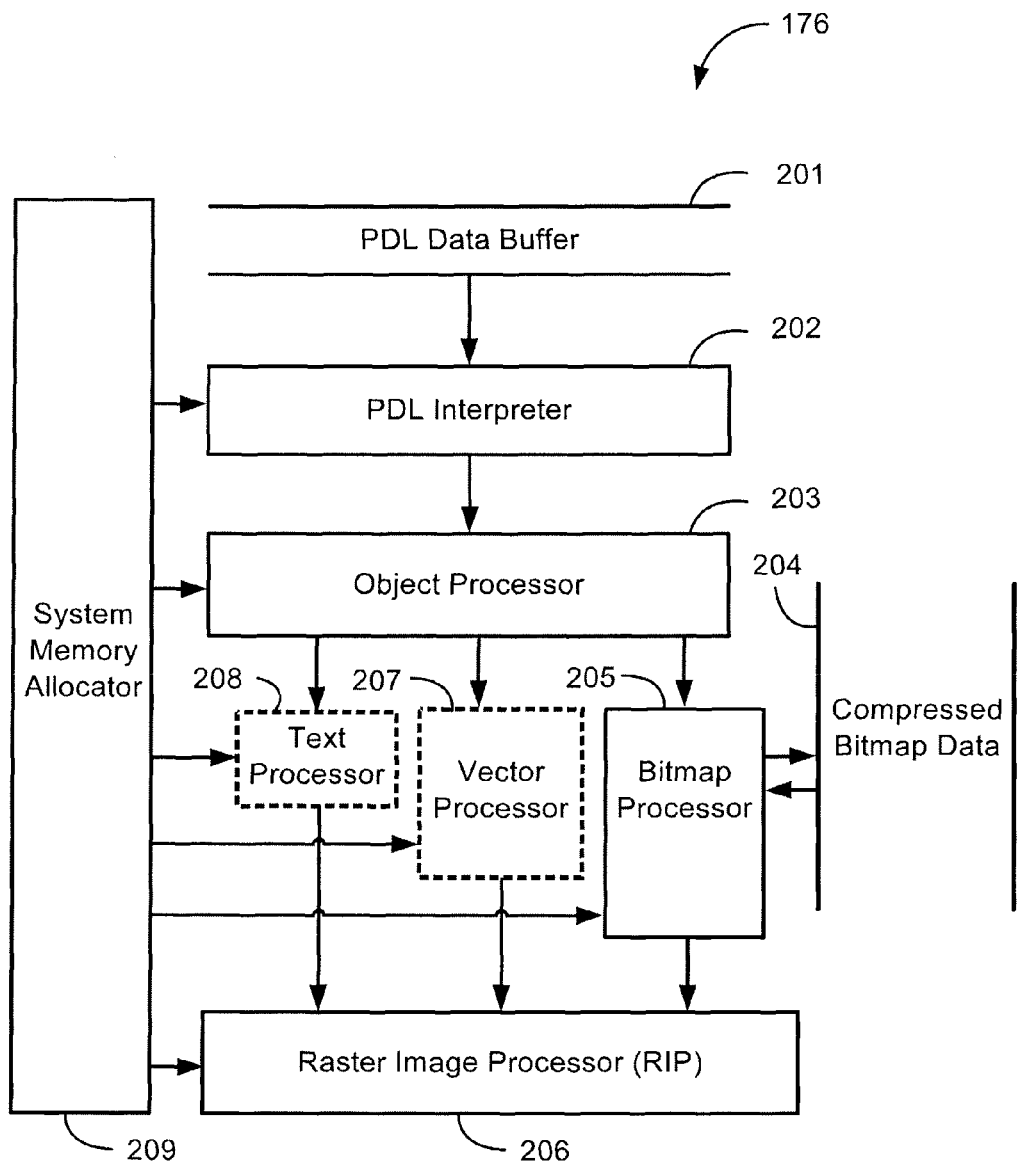
FIG. 2 is a schematic block diagram showing a client print manager for rendering a document.

FIG. 2 is a schematic block diagram showing the client print manager module 176 in more detail. The client print manager module 176 may be implemented as software modules in the form of a PDL interpreter module 202, an object processor module 203, a text processor module 208, a vector processor module 207, a bitmap processor module 205, a raster image processor (RIP) module 206 and a system memory allocator module 209.

PDL data (e.g., a PDL representation of a bitmap to rendered), consisting of PDL commands is stored in a PDL data buffer 201 configured in the memory 180. The PDL data is streamed as one or more bitstreams into the PDL interpreter module 202 which reads and interprets the PDL commands and creates lower level graphical objects suitable for rendering. These graphical objects are then processed by the object processor module 203 which splits the graphical objects into object components and stores the object components in appropriate data stores. For example, bitmap objects are passed to the bitmap processor module 205, vector graphic objects are passed to the vector processor module 207 and text objects are passed to the text processor module 208.

The bitmap processor module 205 uses a compressed bitmap data buffer 204 configured within the memory 180 and will be described in detail below. The object processor 203 forms a display list representation that references the object components. The display list and the objects referenced by the display list are streamed as one or more bitstreams to the raster image processor (RIP) module 206. The RIP module 206 generates pixels from the received bitstreams and these pixels may then be output to the printer engine 177 for the rendering of a page.

Figure 3:
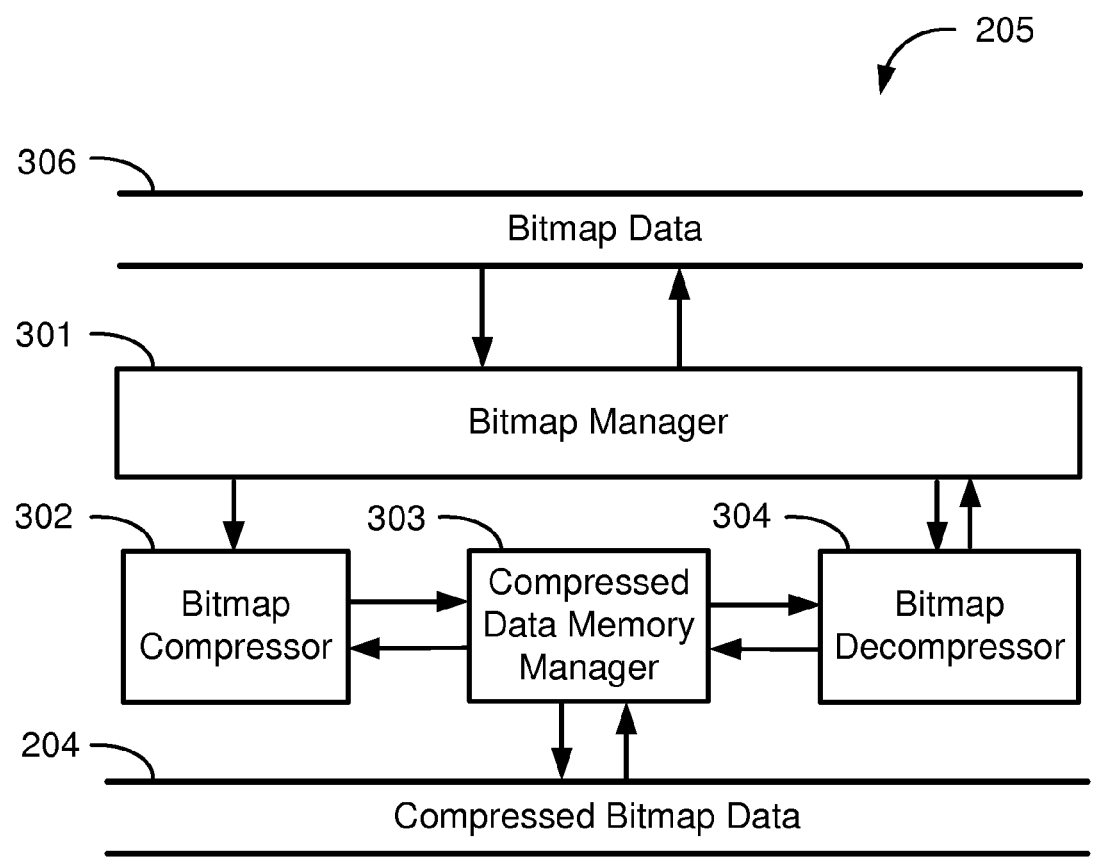
FIG. 3 is a schematic block diagram of a bitmap processor module.

FIG. 3 is a schematic block diagram showing the bitmap processor module 205 in more detail. The bitmap processor module 205 may be implemented as software modules in the form of a bitmap manager module 301, a bitmap compressor module 302, a compressed data memory manager module 303 and a bitmap decompressor module 304. The bitmap decompressor module 304 may alternatively be referred to as a "decoder".

The bitmap compressor module 302 and similarly the bitmap decompressor module 304 are transform-based. For example, the modules 302 and 304 may be based on the joint photographic expert group (JPEG) standard, which allows lossy compressed bitmap data to be arranged in order from most visually perceptible to least visually perceptible elements. The modules 302 and 304 may use progressive mode JPEG compression methods. Such progressive mode JPEG compression methods utilise a discrete cosine transform (DCT) to transform integer pixel values to integer transform coefficients. The DCT typically operates on eight (8) by eight (8) pixel blocks on a colour channel by colour channel basis. Resulting transform coefficients are quantized and arranged in JPEG ziz-zag order. The progressive JPEG compression (or encoding) may be performed by Huffman coding DCT coefficients into a sequence of separate partitions using either spectral selection or successive approximation.

The modules 302 and 304 perform spectral selection where the DCT coefficients are grouped into 'spectral' bands of related spatial frequencies. The bands are then ordered into most visually significant (lower frequencies) to least visually significance (higher frequencies). Alternatively, the modules 302 and 304 may use successive approximation, where the DCT coefficients are stored with lower precision before being refined in later scans.

A quantization table for each component may be a flat table where each entry consists of the value eight (8). However, other quantization tables are possible. For example, a quantization table where the value is four (4) for the DC value of each component, and eight (8) for the AC coefficient values for each component may be used.

If a lossless DCT is used for the modules 302 and 304, quantization is optional, as the DCT coefficients are already integer values. The transformed coefficients may be split into multiple bitstreams, each of these bitstreams being encoded into separate partitions or groupings in the memory 180. For example, the DC coefficient is the most visually important coefficient and is encoded into the most visually significant partition (or group). This DC partition (or group) is followed by the next most visually significant partition comprising a range of other spectral coefficients in the form of grouped upper (most significant) spectral bands of AC coefficients and so on until finally the remaining lower (least visually significant) group of spectral bands are separately encoded into the last partition (or group). Each of these grouped AC coefficient bitstreams, corresponding to each of the visually significant partitions, is entropy encoded in a lossless manner using a suitable Huffman entropy encoder. A method 700 of storing a bitmap by partitioning memory will be described in detail below with reference to FIG. 7.

The compressed data memory manager module 303 has access to the compressed bitmap data buffer 204 for the purpose of storing compressed bitmap data representing a bitmap. The bitmap manager module 301 has access to a bitmap data buffer 306 configured within the memory 180, where incoming PDL bitmap data is located (or stored). The bitmap manager module 301 maintains suitable data structures for storing details about the compressed bitmap data, such as, for example, bitmap height, bitmap width, colour depth and colour components. The bitmap manager module 301 also stores any affine transforms associated with a bitmap that are required for rendering a final page.

FIG. 4 is a schematic block diagram of the compressed data memory manager module 303 in more detail. The compressed data memory manager module 303 may be implemented as software modules in the form of a compressed data manager module 402, a tile processor module 403, a partition manager module 404 and a memory manager module 405.

The compressed data memory manager module 303 performs a plurality of functions including: memory allocation, compressed bitmap data location, compressed bitmap data I/O and, when memory resources are exhausted, memory reallocation.

The memory manager module 405 acquires memory blocks from the system memory allocator module 209. The memory manager module 405 subsequently distributes these memory blocks to each of the other modules 402, 403 and 404 within the compressed data memory manager module 303 as requested. The memory manager module 405 records physical memory addresses of allocated memory blocks in a suitable structure for future reference. The partition manager module 404 is responsible for logically arranging the memory blocks allocated by the memory manager module 405 into partitions or groups. The partition manager module 404 is also responsible for writing and reading partitioned data bitstreams to and from the partitions. If and when there is no more memory available from the system memory allocator module 209 (i.e., the memory resources of the system 100 have been exhausted) then the memory manager module 405 takes steps to recover and re-distribute existing memory within the compressed data memory manager module 303. The re-distribution of existing memory is achieved by deleting partitions including the partition bitstreams in order to free memory for re-distribution. By deleting partitions associated with least visually perceptible elements, memory blocks are made available for use of compressing remaining images belonging to the page.

FIG. 5 is a schematic block diagram showing an arrangement 500 of partitions within the compressed bitmap data memory buffer 204 configured within the memory 180. The data storage arrangement 500 is configured by the partition manager module 404. Each partition (e.g., 509) comprises a head storage block (e.g. 505) and one or more data blocks (e.g. 506). Each of the data blocks (e.g., 506) comprises one or more bitstreams. The head storage block 505 of memory contains information about each of the partitions, such as number of blocks in a partition, size of data blocks, current I/O pointer position and other such information that is required by the partition manager module 404 to access the partition. The data blocks (e.g. 506) are each of a fixed size of memory comprising one or more bitstreams with each data block being identified by a unique data block identifier (ID).

For a partition 509, each data block (e.g. 506) has an integer number of bytes 507 reserved for writing the data block ID of a following data block 508 allocated to the partition 509. The number of reserved bytes 507 for each data block is dependent on a pre-determined size of data blocks and the size of free memory pool. Typically, four bytes are reserved. The memory manager module 405 records the physical location of the data blocks (e.g., 506) and associates the data blocks with the relevant data block ID (e.g., 507).

During the printing of a page, the PDL interpreter module 202 streams bitmap data as one or more bitstreams to the object processor module 203 using a predetermined sequence of function calls for each particular image represented by the input bitmap data. Such a predetermined sequence of function calls is referred to as a bitmap transaction. Each bitmap transaction comprises a series of steps forming the method 700 of storing a bitmap, which will now be described in detail with reference to FIG. 7. The method 700 may be implemented as software resident in the memory 180 and being controlled in its execution by the processor 185.

The method 700 begins at step 701, where the processor 185 executes a BitmapStart function 710. The BitmapStart function 710 accepts bitmap width and height values (in pixels) associated with the bitmap represented by bitmap data received by the PDL interpreter module 202. As described above, the PDL interpreter module 202 receives a PDL representation of the bitmap from the PDL data buffer 201.

At step 701, the BitmapStart function 710, under execution of the processor 185, receives a bit depth value in bits per pixel values, associated position information representing the position that the bitmap is to be printed on a page and any other relevant information, such as colour format (e.g. RGB, BGR, CMYK), interpolation on/off, constant opacity value, restrictions on allowed compression, paint immediately flag and information on data storage (row-step). The BitmapStart function 710 also receives a transform matrix associated with the bitmap. The transform matrix will be described in detail below. The data and information received at step 701 may be stored in the memory 180.

Then at the next step 702, the BitmapStart function 710, under execution of the processor 185, performs the step of examining the transform matrix of the PDL representation of the bitmap and scaling information (i.e., bitmap width and height values) is extracted from the PDL representation and stored in the memory 180.

The method 700 then proceeds to step 703, where the scaling information extracted in the previous step 702 is used by the processor 185 for determining a scaling factor required for rendering the bitmap. The scaling factor may be stored in the memory 180. Accordingly, the scaling factor is determined from the PDL representation of the bitmap (or bitmap image). The determination of the scaling factor will be described further below with reference to FIG. 8. The scaling factor is configured for use in processing decoded spectral coefficients at the bitmap decompressor module (or decoder) 304.

Also at step 703, the processor 185 performs the step of determining a range of spectral coefficients in a grouping based on the scaling factor. In particular, the distribution of AC coefficients across partitions and the total number of partitions required for the bitmap is determined at step 703. A method 800 of determining the distribution of AC coefficients across partitions, as executed at step 703, will be described in detail below with reference to FIG. 8.

At the next step 704, the BitmapStart function 710, under execution of the processor 185, completes and returns a value, n_bytes, representing an amount of bitmap data to be transferred to the RIP module 203 as one or more bitstreams during each call to a BitmapRead function 711 function, which will now be described. The bitmap data is stored in the bitmap data memory buffer 204 configured within the memory 180 of the printer 115.

At step 705 the BitmapRead function 711, under execution of the processor 185, accepts up to n_bytes of bitmap data from the BitmapStart function 710. Then at the next step 706, the BitmapRead function 711 encodes the bitmap data using bitmap compressor module 302 and transfers bitmap data from the PDL interpreter module 102 to the RIP module 206. In this instance, the bitmap compressor module 302 is "partition based." If the BitmapRead function 711 determines that there is more bitmap data available in the bitmap data memory buffer 204 at step 707, then the process 700 returns to step 705. Otherwise, the process 700 proceeds to step 708.

A BitmapFinish function 712 completes a bitmap transaction at step 708 by storing the bitmap data transferred to the RIP module 206 by the BitmapRead function 711 in the memory 180. The bitmap data transferred to the RIP module 206 by the BitmapRead function 711 is stored in a "display list", along with a transformation matrix and any other data (e.g. colour format), interpolation on/off, constant opacity value, restrictions on allowed compression, paint immediately flag, information on data storage (e.g., row-step), fill table index, bounding box, associated level entries or clips, checksum value, hardware control bits, extrusion information, strip/fragment data, memory location, colour palette details) necessary for rendering the transferred bitmap data.

In the event that the processor 185 determines that all memory resources of the system 100 are exhausted, the system memory allocator module 209 needs to recover memory by deleting partitions from bitmaps on the page until sufficient memory has been recovered. A method 1000 of recovering memory on the system 100 will be now be described with reference to FIG. 10.

The method 1000 may be implemented as software, in the form of the bitmap processor module 205, resident in the memory 180 of the printer 115 and being controlled in its execution by the processor 185. The method 1000 determines a number of partitions (or groupings), MAX_nPARTITION, where each partition contains the encoded spectral coefficients. The number, MAX_nPARTITION, applies to all previously stored bitmaps.

The deleting method 1000 performs steps for deleting partitions, including encoded spectral coefficients, from previously stored bitmaps (or bitmap images) up to the determined number of partitions (or groupings), MAX_nPARTITION. Each of the partitions comprises one or more encoded bitstreams in the form of data blocks (e.g., 505, 506).

The deleting method 1000 begins at setting step 1001, where the processor 185 sets a variable Global_nPartition to MAX_nPARTITION. Global_nPartition is an integer value stored in a persistent portion of the memory 180 that lasts for the lifetime of the page. Global_nPartition indicates the current number of partitions of any bitmap on the page. MAX_nPARTITION indicates the number of partitions present in an AC coefficient scan partition table. One implementation of such an AC coefficient scan partition table, labelled Table 1, is shown below. Setting step 1001 is either executed at the beginning of each page or alternatively setting step 1001 may be executed at the start of a job, comprising several pages.

At the next step 1002, the variable, Global_nPartition, is decremented by one and the current bitmap index, i, is set to one. The method 1000 then proceeds to examining step 1003 where metadata for a current bitmap (i.e., bitmap[i]) is examined and a number of remaining partitions is determined At decision step 1004, if the processor 185 determines that the number of partitions remaining for bitmap[i] is equal to that Global_nPartition, then the method 1000 proceeds to step 1005. Otherwise, the method 1000 proceeds directly to step 1006.

At deleting step 1005, the partition equal to Global_nPartition, associated with bitmap[i], is deleted, and the memory in which bitmap[i] was stored is returned to a free list of the system memory allocator module 209. As described above, the partition deleted at step 1005 contains one or more encoded spectral coefficients. The encoded spectral coefficients of the deleted partition are associated with at least one least visually perceptible element of the bitmap[i].

At decision step 1006, if the bitmap processor module 205, under execution of the processor 185, determines that there are bitmaps remaining to be processed, then the method 1000 proceeds to incrementing step 1007. Otherwise, the deleting method 1000 proceeds to decision step 1008. At incrementing step 1007, bitmap index, i, is incremented by one and the method 1000 returns to examining step 1003.

At decision step 1008, if the system memory allocator module 209 determines that sufficient memory has been recovered, then the method 1000 concludes. Otherwise, if the result of decision step 1008 is false then the method 1000 proceeds to step 1009.

At decision step 1009, if Global_nPartition is greater than one (1), then the method 1000 returns to step 1002. If the result of decision step 1009 is false, then the method 1000 finishes. Step 1009 is carried out to ensure that, at the very least, the DC value for the bitmap remains.

The transform matrix, $\Omega$, for an image describes where on the rendered page the bitmap is situated (translation), along with any scaling, rotation or skew that is to be applied to the bitmap (or bitmap image). For example, the transform matrix that describes bitmap scaling and translation is defined as Equation 1, below:

$$\Omega = \begin{bmatrix} S_x & 0 & 0 \\ 0 & S_y & 0 \\ T_x & T_y & 1 \end{bmatrix} \qquad (1)$$

where $S_x$ and $S_y$ are the scaling factors for the bitmap in the x and y directions respectively and $T_x$ and $T_y$ are the translation values for the bitmap in the x and y directions respectively.

Figure 9A:
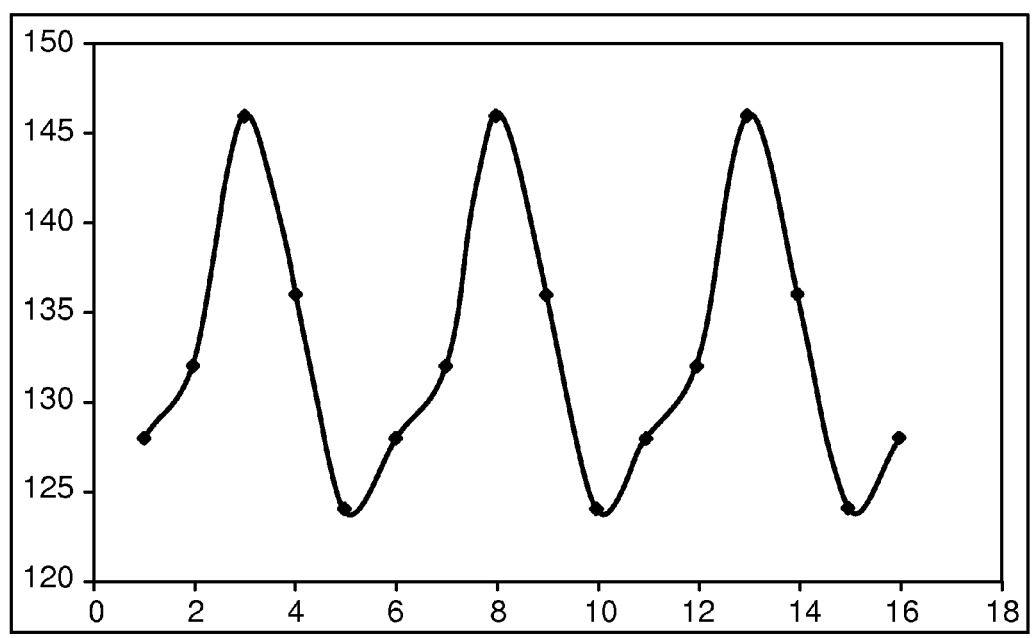
FIG. 9a shows a graph of a typical signal consisting of sixteen data points.
Figure 9B:
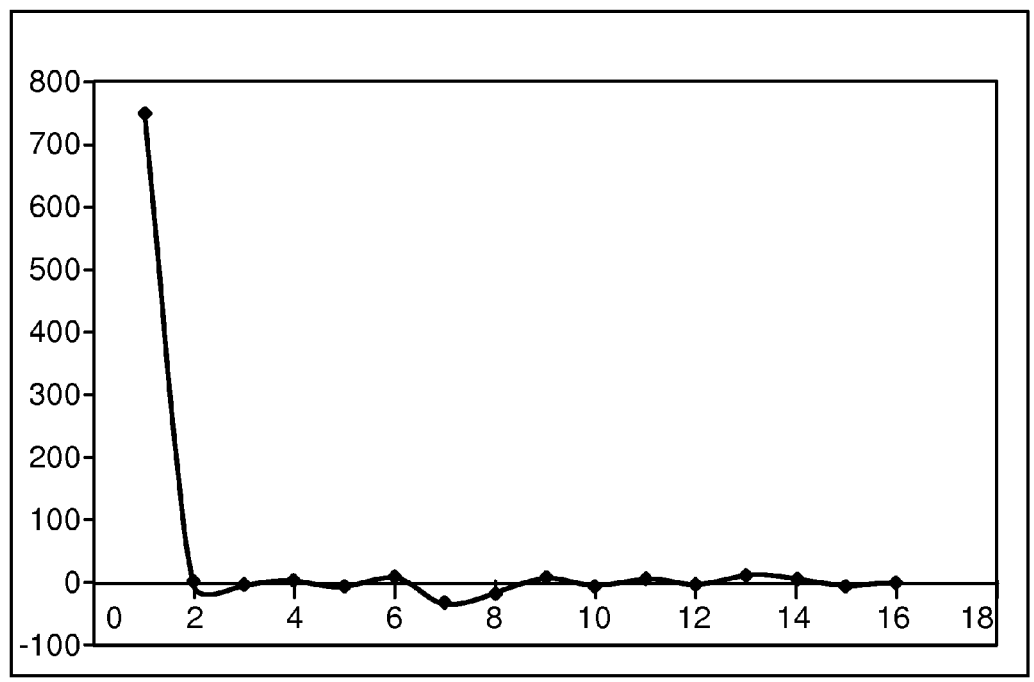
Figure 9C:
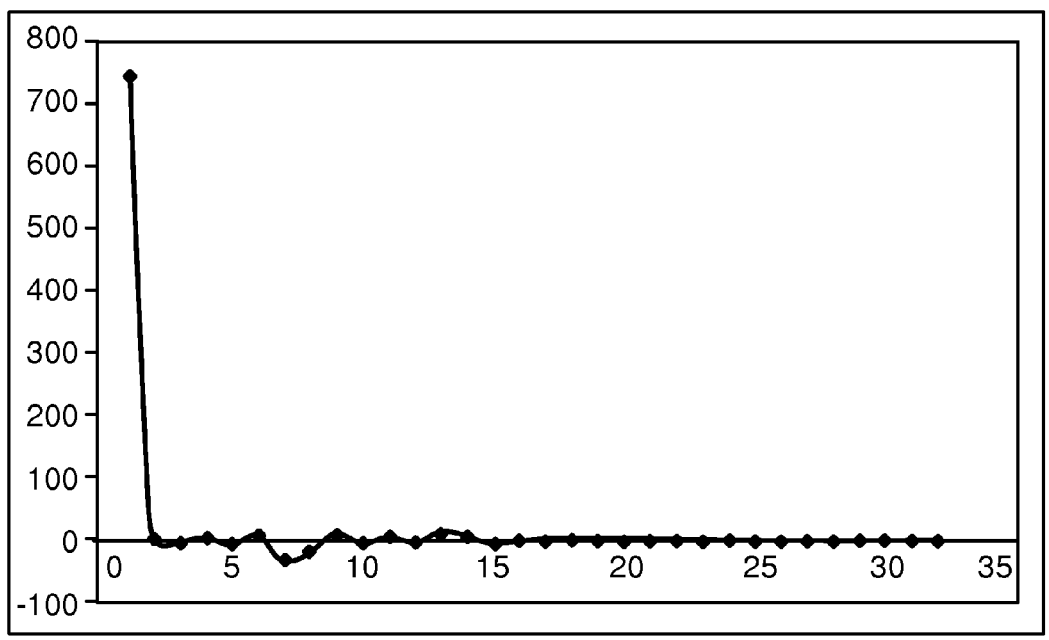
FIG. 9c shows a graph of the discrete cosine transform of the signal in FIG. 9b after zero padding.
Figure 9D:
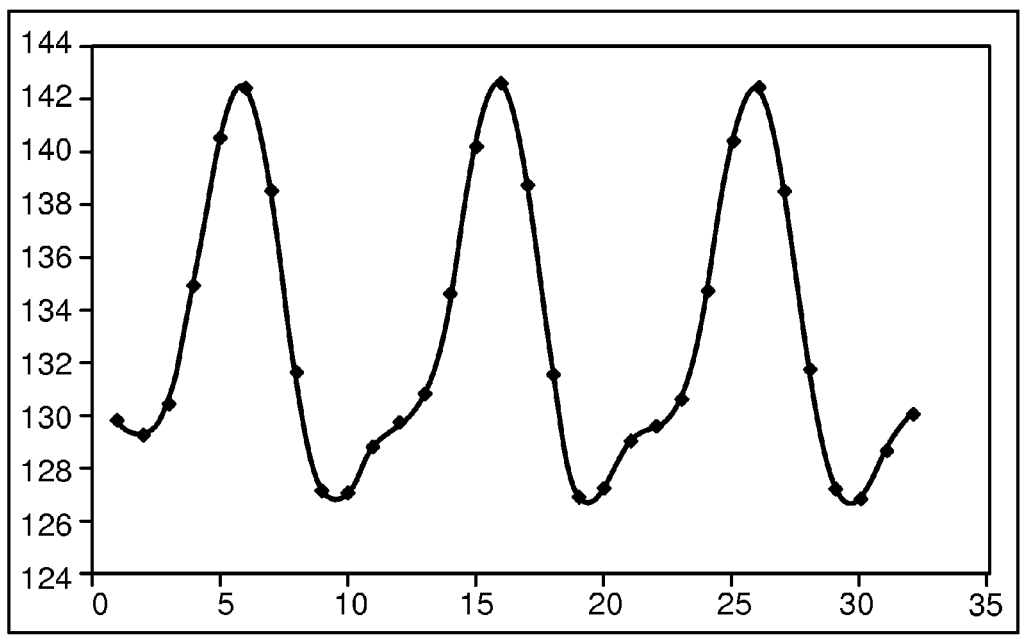
FIG. 9d shows a graph of the reconstructed signal from the zero padded discrete cosine transform in FIG. 9c.
Figure 10:
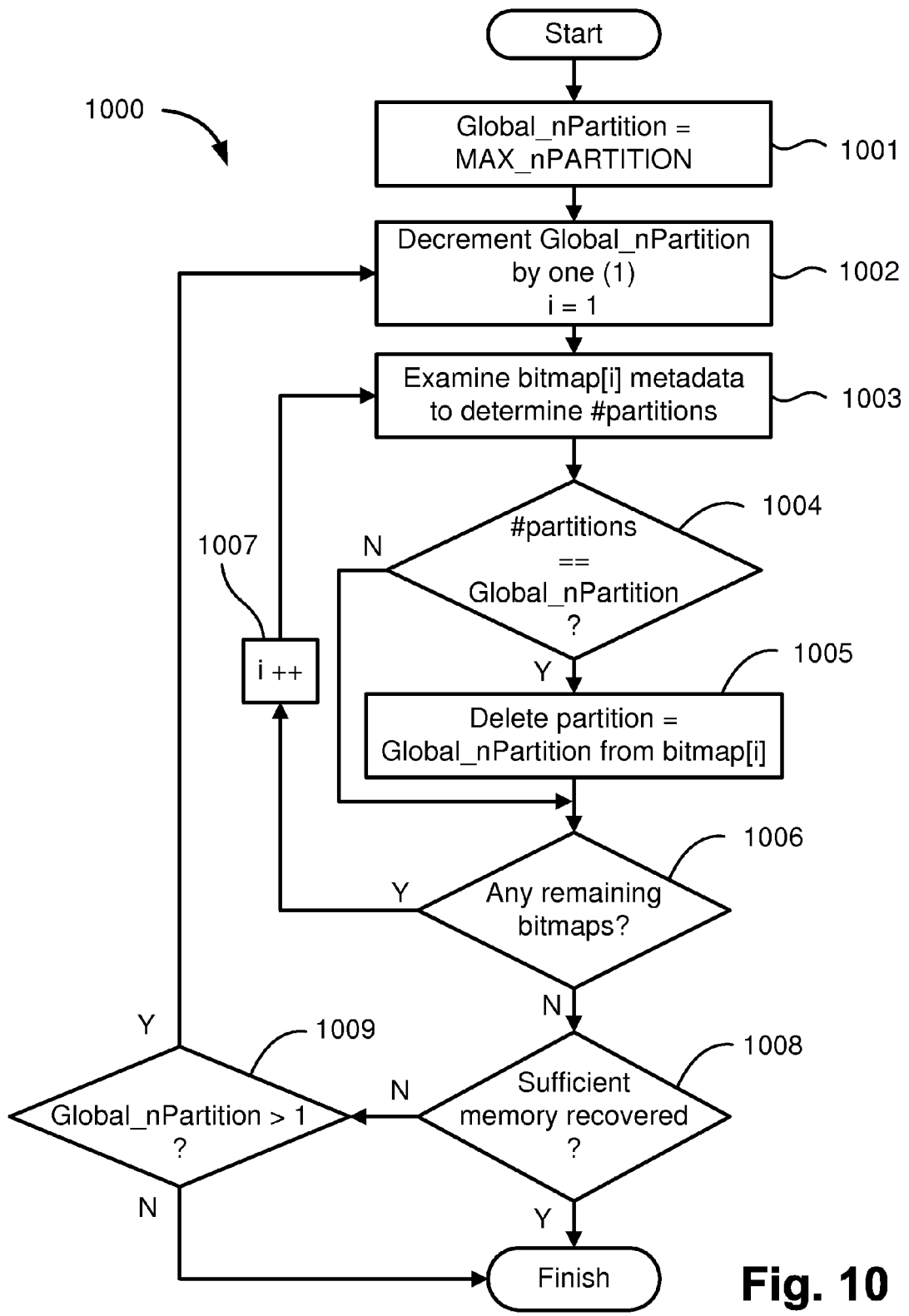
FIG. 10 is a flow diagram showing a method of recovering memory.

Zero padding in the frequency domain results in an increased sampling rate in the spatial domain. Zero padding in the frequency domain is often referred to as spectral interpolation. Referring to FIGS. 9a-d, spectral interpolation will be described. FIG. 9a shows a sample signal consisting of sixteen (16) discrete samples. FIG. 9b is a forward discrete cosine transform (FDCT) of the signal shown in FIG. 9a, using a FDCT with support equal to sixteen (16). FIG. 9c shows the FDCT signal from FIG. 9b with an additional padding of sixteen (16) zeros, taking the total number of sample points to thirty two (32). FIG. 9d shows the reconstructed signal in the spatial domain using an inverse discrete cosine transform (IDCT) with support equal to thirty two (32). The net result is that the signal from FIG. 9a is effectively scaled by a scaling factor of two (2). Spectral interpolation is used for determining the range of DCT coefficients associated with each partition. The DCT coefficients are broken into scans as described in AC coefficient scan partition table (i.e., Table 1) as shown below. Each row in Table 1 specifies one (encoding) partition. The DCT coefficients from each of the components are coded sequentially. The Ss-Se column of Table 1 specifies the start (Ss) and end (Se) indices, following a JPEG-style zigzag sequence of DCT coefficients, of a contiguous sub-sequence of DCT coefficients that are encoded in the partition.

In the arrangement of Table 1, the fifth row of the scan partition table specifies that, in the fifth partition DCT coefficients, AC coefficients ten (10) to fourteen (14) are encoded. The arrangement of AC coefficients in Table 1 is suitable for a bitmap that does not require scaling (i.e., $S_x = S_y = 1$) and that utilises all available partitions. The AC coefficient scan partition table of Table 1 is configured to balance smooth bitmap degradation with uniform distribution of memory usage.

TABLE 1 scan partition table

| Partition | AC Range | Ss-Se |
|---|---|---|
| 1 | 1 | 0-0 |
| 2 | 2 | 1-2 |
| 3 | 3 | 3-5 |
| 4 | 4 | 6-9 |
| 5 | 5 | 10-14 |
| 6 | 6 | 15-20 |
| 7 | 9 | 21-29 |
| 8 | 10 | 30-39 |
| 9 | 12 | 40-51 |
| 10 | 12 | 52-63 |

Depending on the internal colour space used by the bitmap compressor module 302, different arrangements of scans may be appropriate. For example, if the internal colour space used by the bitmap compressor module 302 is RGB then the scan partitions shown in Table 1 are appropriate for each colour channel. Alternatively, if the internal colour space used by the bitmap compressor module 302 is YCbCr, then Table 1 is appropriate for the luminance colour channel, Y, but a different arrangement of scan partitions is appropriate for the chrominance channels, Cb and Cr. Other alternatives are also possible.

Figure 8:
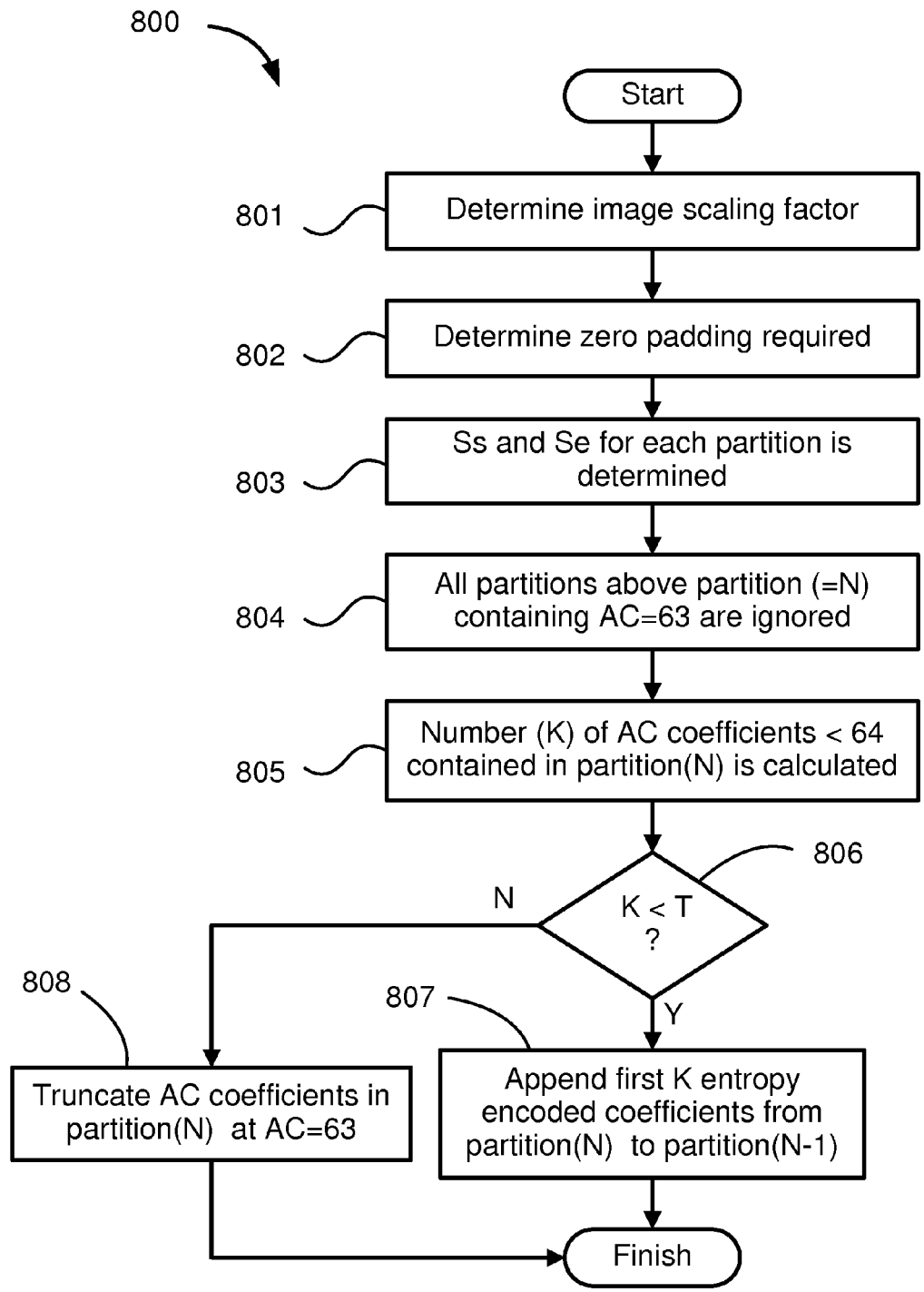
FIG. 8 is a flow diagram showing a method of determining the distribution of AC coefficients across partitions.

Referring to FIG. 8, the method 800 of determining the distribution of AC coefficients across partitions, as executed at step 703, will now be described. In accordance with the method 800, the processor 185 performs steps for encoding spectral coefficients of the bitmap (or bitmap image). The method 800 may be implemented as software, resident in the memory 180 of the printer 115 and being controlled in its execution by the processor 185.

The method 800 starts at determining step 801 where the processor 185 performs the step of determining the scaling factor $S = \sqrt{S_x S_y}$ for the bitmap, where $S_x$ and $S_y$ are the scaling factors for the bitmap in the x and y directions. The determined scaling factor S may be stored in memory 180.

The method 800 then proceeds to determining step 802 where effective zero padding, Z, is determined by the processor 185 and stored in memory 180. The effective zero padding required is defined as Equation 2 below:

$$Z = \lfloor 64S \rceil \quad (2)$$

In the next step 803, the number of AC coefficients, $\rho_i$, for the ith partition $P_i$ is determined as Equation 3 below:

$$\rho_i = \left\{ Z \frac{\Lambda e_i - \Lambda s_i + 1}{64} \right\} \quad (3)$$

where $\Lambda s_i$ and $\Lambda e_i$ represent the AC coefficient start and end indices for the ith partition for the preferred AC coefficient scan partition table (i.e., Table 1) and { } rounds the value to the nearest integer. The start and end indices for each partition $P_i$ may then be determined as Equations 4a and 4b:

$$Se_i = \sum_{j=0}^{j=i} \rho_j \quad (4a)$$

$$Ss_i = Se_i - \rho_i + 1 \quad (4b)$$

In the following steps 804 to 807, the processor 185 performs steps for entropy encoding the range of spectral coefficients into separate partitions or groupings.

In particular, at step 804, the partition $P_N$, containing the sixty-fourth ($64^{th}$) AC coefficient is identified and all (possible) partitions above the partition $P_N$ are ignored. The method 800 then proceeds to step 805 where the number of coefficients, K, less than sixty-four (64) contained in the partition $P_N$ is determined by the processor 185 and stored in memory 180. In decision step 806, K is compared with a threshold value T. If K is less than T then the method 800 proceeds to step 807 where the first K AC coefficients in $P_N$ are appended to $P_{N-1}$ and $P_N$ is ignored. Also at step 807, the processor 185 performs the step of storing each partition $P_i$ containing bitstreams in the form of the data blocks (e.g., 505) in the memory 180. Accordingly, the encoded spectral coefficients are stored in the partitions within the memory 180. The processor 185 may subsequently perform the step of transmitting the encoded spectral coefficients within each partition $P_i$ or grouping to the bitmap decompressor module (or decoder) 304.

If K is greater or equal to T at step 806 then the method 800 proceeds to step 808, where the processor 185 truncates the AC coefficients such that $Se_N = 64$ and $Ss_N = 64 - K$.

Figure 6A:
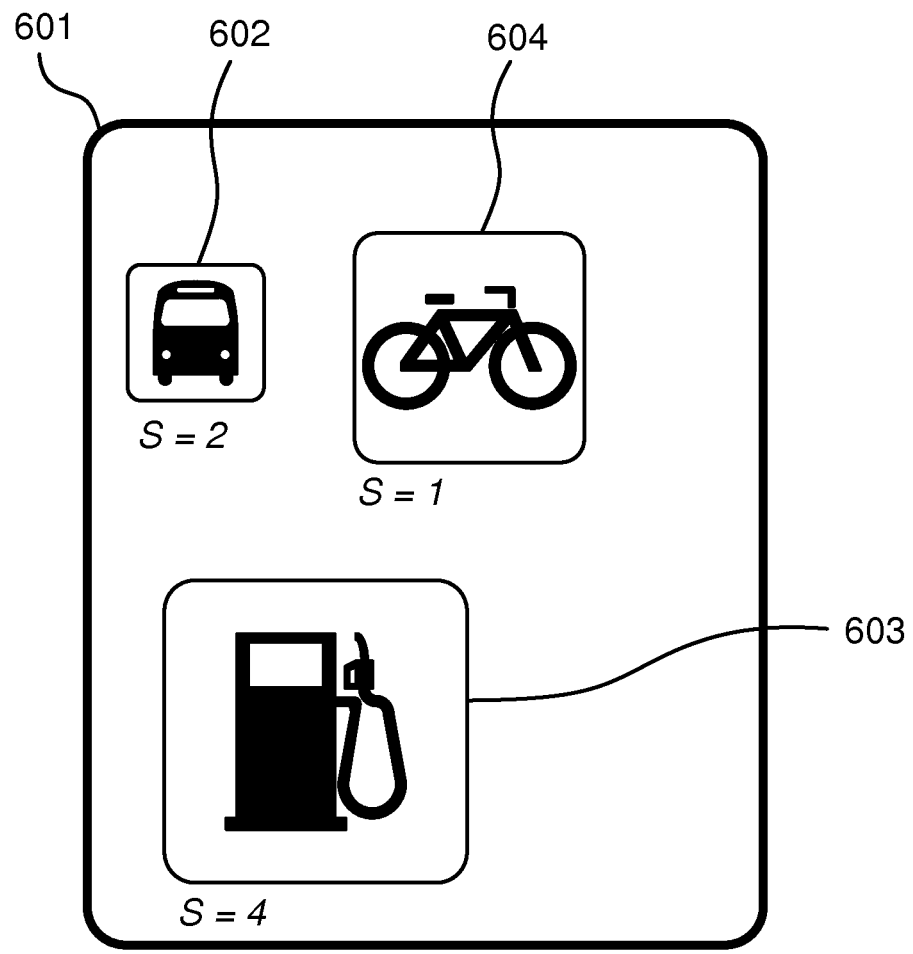
FIG. 6a shows a schematic block diagram of a typical page for rendering consisting of three bitmaps having differing scaling factors.

By way of example, FIG. 6a shows a page 601 that contains three bitmap images 602, 603 and 604, each bitmap 602, 603 and 604 having a different scaling factor. The maximum allowable number of partitions, MAX_nPARTITIONS, is ten (10) for the bitmaps 602, 603 and 604 shown on page 601. Bitmap 602 has a scaling factor of S=2, bitmap 603 has a scaling factor of S=4 and bitmap 604 has a scaling factor of S=1.

Figure 6B:
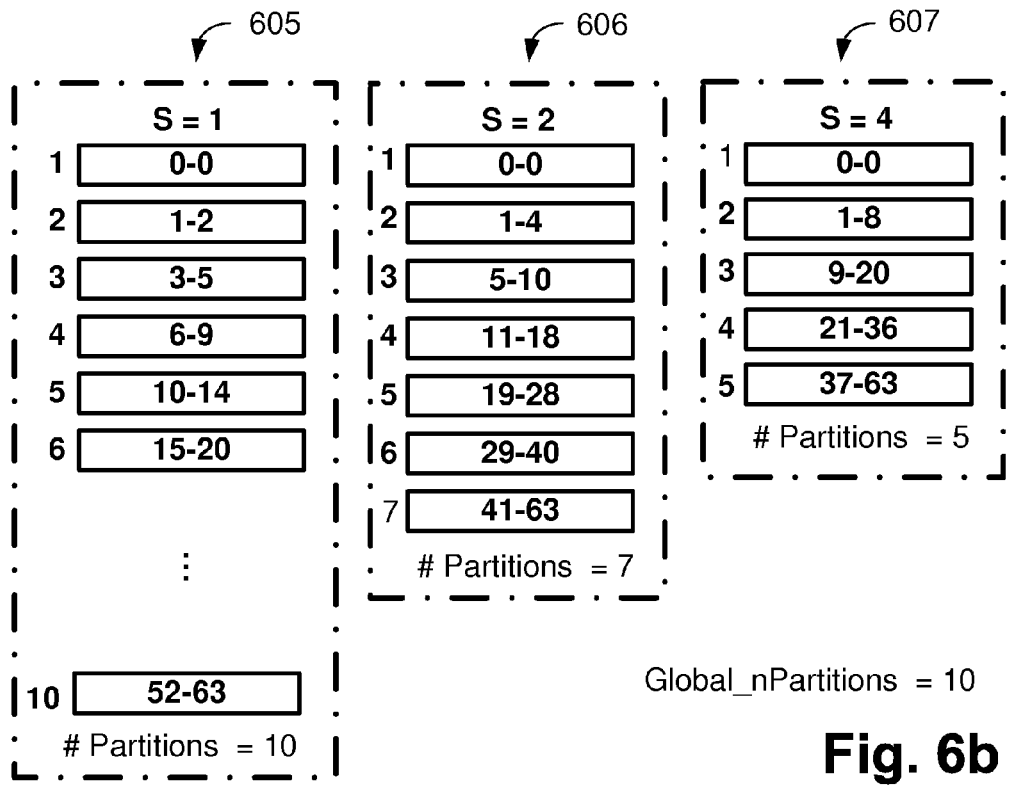

Referring now to FIG. 6b, for each of the three bitmaps 602, 603 and 604 the arrangement of AC coefficients in their respective scan partitions or groupings is shown for the case in method 1000 where Global_nPartitions=ten (10). Bitmap 604 requires no scaling on the final rendered page and therefore has a partition arrangement 605, as seen in FIG. 6b, that is the same as that shown in Table 1. Bitmap 602 has a different partition arrangement 606, as seen in FIG. 6b, to that of bitmap 604 since bitmap 602 has been scaled by a factor of two (2). As a result, all AC coefficients for bitmap 602 are distributed across seven separate partitions 606. Bitmap 603 also has a different partition arrangement 607, as seen in FIG. 6b, to that of bitmap 604, since bitmap 603 has been scaled by a factor of four (4). As a result, all AC coefficients for bitmap 603 are distributed across five separate partitions.

Figure 6C:
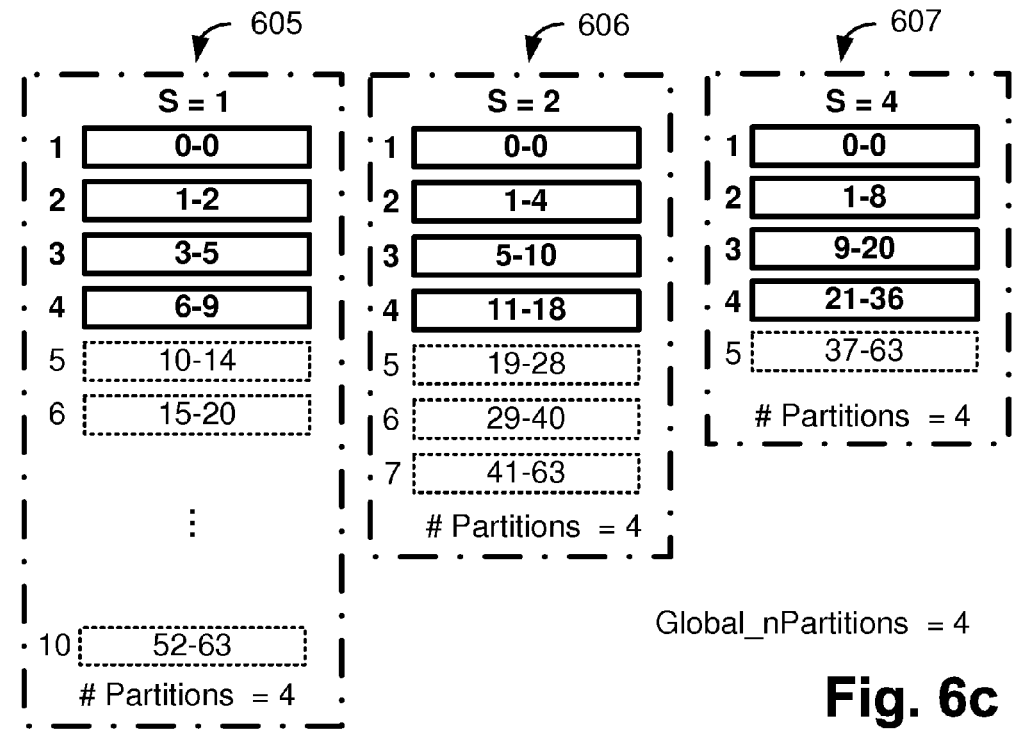
FIG. 6c shows a schematic block diagram of an arrangement of memory partitions referred to in FIG. 6b after the memory recovery has occurred.
Figure 7:
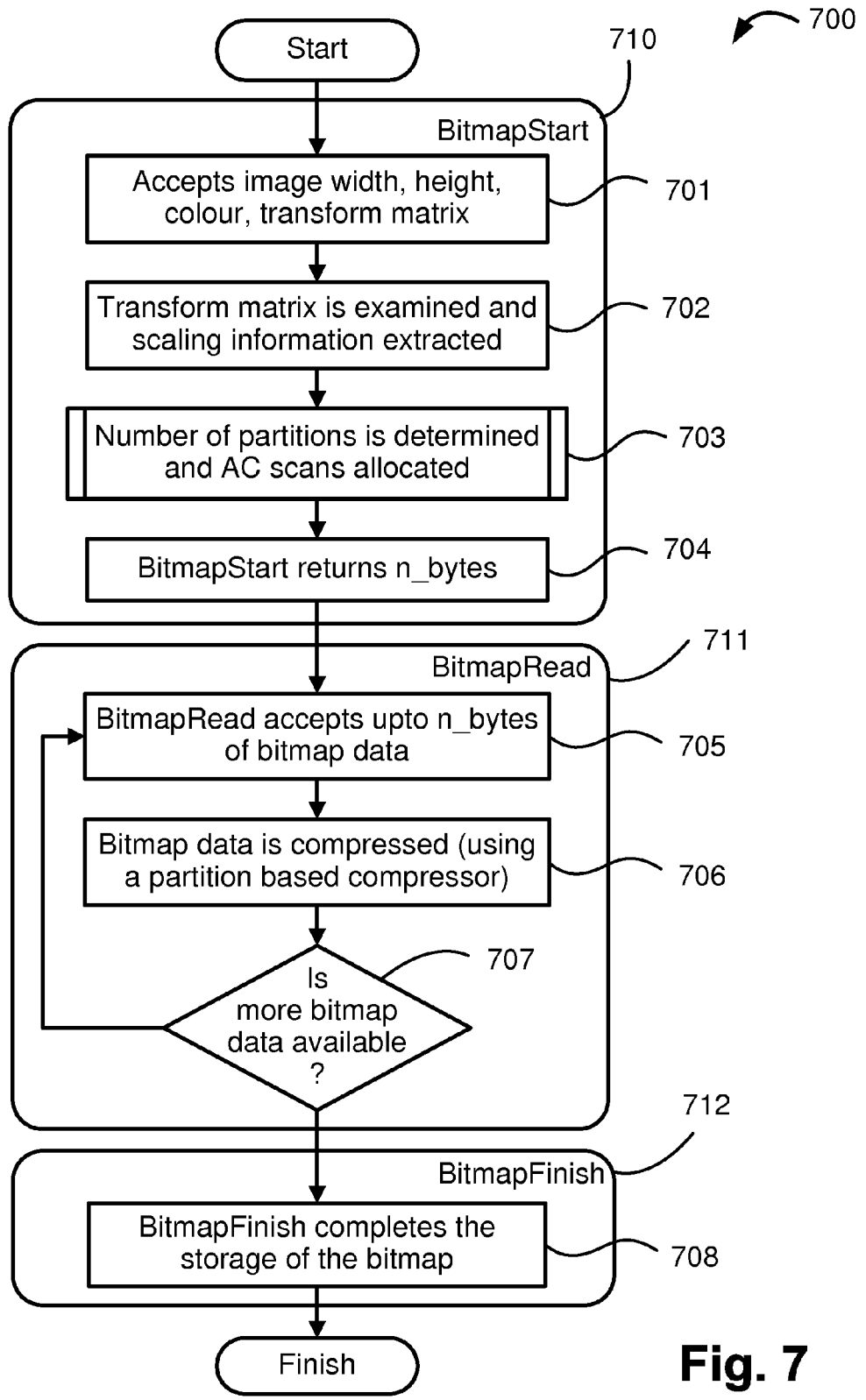
FIG. 7 is a flow diagram showing a method of storing a bitmap.

Referring now to FIG. 6c, the state of bitmaps 602, 603 and 604 are shown when method 1000 has executed step 1002 a total of six times for the page 601, and Global_nPartition=four (4). A total of five partitions have been deleted from the partition arrangement 605 of bitmap 602, resulting in the largest AC coefficient remaining being AC=nine (9). A total of three partitions have been deleted from the partition arrangement 606 of bitmap 603, resulting in the largest AC coefficient remaining being AC=18. One partition 610 has been deleted from the partition arrangement 607 of bitmap 602, resulting in the largest AC coefficient remaining being AC=thirty six (36).

In an alternative to the example shown in FIGS. 6a to 6c, the arrangement of AC coefficients for each incoming PDL bitmap may be as shown in Table 1 above, where all compressed bitmaps consist of ten (10) partitions. In the arrangement of Table 1, the number of partitions deleted from each bitmap is dependent on the scaling factor associated with the bitmap. In the arrangement of Table 1, partitions are grouped so as to match the values determined from equations 4a and 4b as closely as possible. Each group of partitions is assigned a number and, as previously described above, groups of partitions are deleted based on Global_nGroup. Consistent with Global_nPartition, Global_nGroup indicates the current number of groups of partitions of any bitmap on the page. For example, for a scaling factor of one (1), there are ten (10) groupings each containing one (1) partition. Alternatively, for a scaling factor of two (2), there are five (5) groupings, each containing two (2) partitions, where group one (1) consists of partitions one (1) and two (2); group two (2) consists of partitions three (3) and four (4) and so on.

Figure 11:
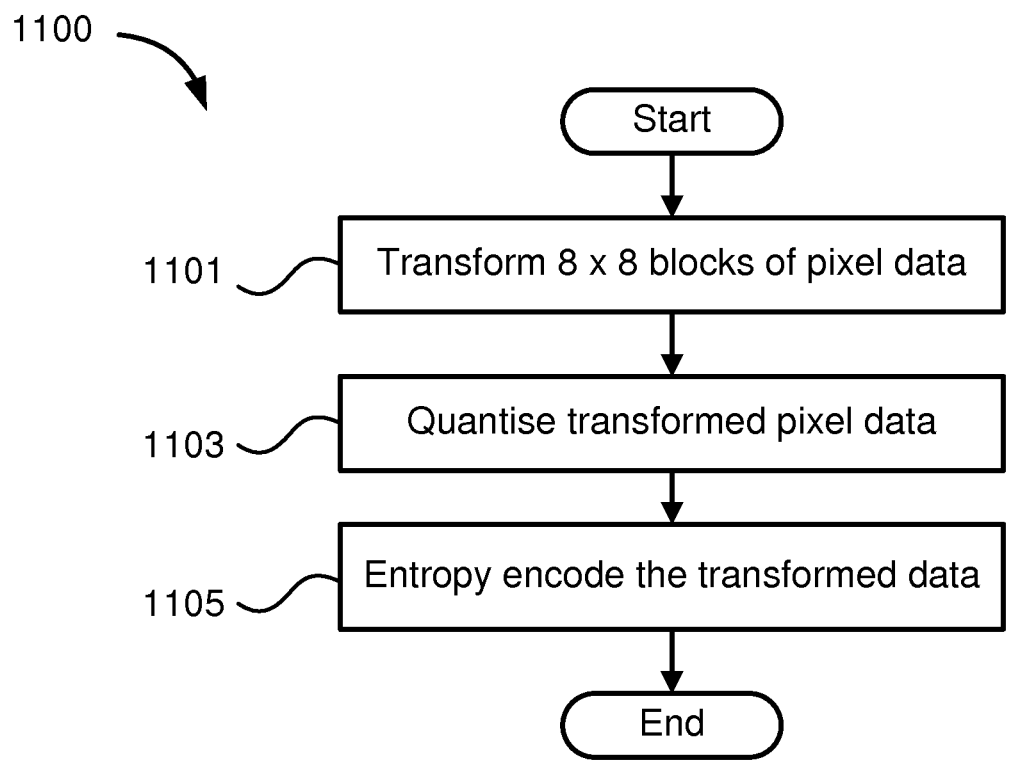
FIG. 11 is a flow diagram showing a method of encoding spectral coefficients.

A method 1100 of encoding spectral coefficients of an image in one alternative arrangement will now be described with reference to FIG. 11. The method 1100 may be implemented as software resident in the memory 180 and being controlled in its execution by the processor 185 of the printer 115.

The method 1100 may be executed when the bitmap compressor module 302 is a baseline JPEG compressor. Suitable quantisation tables may be determined as described above. The method 1100 begins at step 1101, where 8×8 blocks of pixel data of the image are transformed by the processor 185 using a FDCT in the manner described above. At the next step 1103, the transformed pixel data is quantised using a flat eight (8) quantisation table and stored in the memory 180.

Then at step 1105, the transformed data is arranged in typical JPEG zig-zag ordering and entropy encoded by the processor 185. Also at step 1105, all AC coefficients are written to a single bitstream and stored in the compressed bitmap data buffer 204 configured within the memory 180. In this instance, when the system memory allocator module 209 determines that memory resources have been exhausted and memory needs to be reclaimed, the module 206 requests the bitmap processor module 205 to degrade previously stored bitmaps and return the recovered memory. For such a baseline JPEG compressor, rather than partitions being discarded, the entropy encoded bit stream is decompressed in order to retrieve the 8×8 blocks of DCT coefficients. The DCT coefficients may be re-quantized in such a fashion that the AC coefficients relating to the least visually significant data, as defined by the AC ranges in Table 1, are set to zero. The remaining AC coefficients may then be entropy encoded and written to memory 180 as a single bitstream to the compressed bitmap data buffer 204.

Alternatively, other quantisation table combinations are possible. In one arrangement a 'quality' factor associated with a JPEG bitmap is considered, along with the scale factor. The JPEG quality factor affects the individual values in the quantisation tables such that if a quality factor of '100' is selected then reconstructed bitmaps are visually indistinguishable from a source bitmap. As the quality factor is decreased, the individual values in the quantisation table increase, resulting in greater quantisation of the DCT coefficients. This has the net effect of introducing noticeable artefacts to the reconstructed image, and these artefacts become more visually apparent as the quality factor is further decreased. Accordingly, information in images that have been compressed with a lower quality factor may be further preserved, rather than images that have been compressed with a higher quality factor.

An example of where the quality factor arrangement may be utilised is in the case where a current bitmap has already been JPEG encoded and is passed from the PDL interpreter module 202 to the object processor module 203 as a JPEG compressed bitstream. In this example, the current bitmap is transcoded by the bitmap compressor module 302 rather than compressed from raw pixels, as described in the other arrangements described above.

Figure 12:
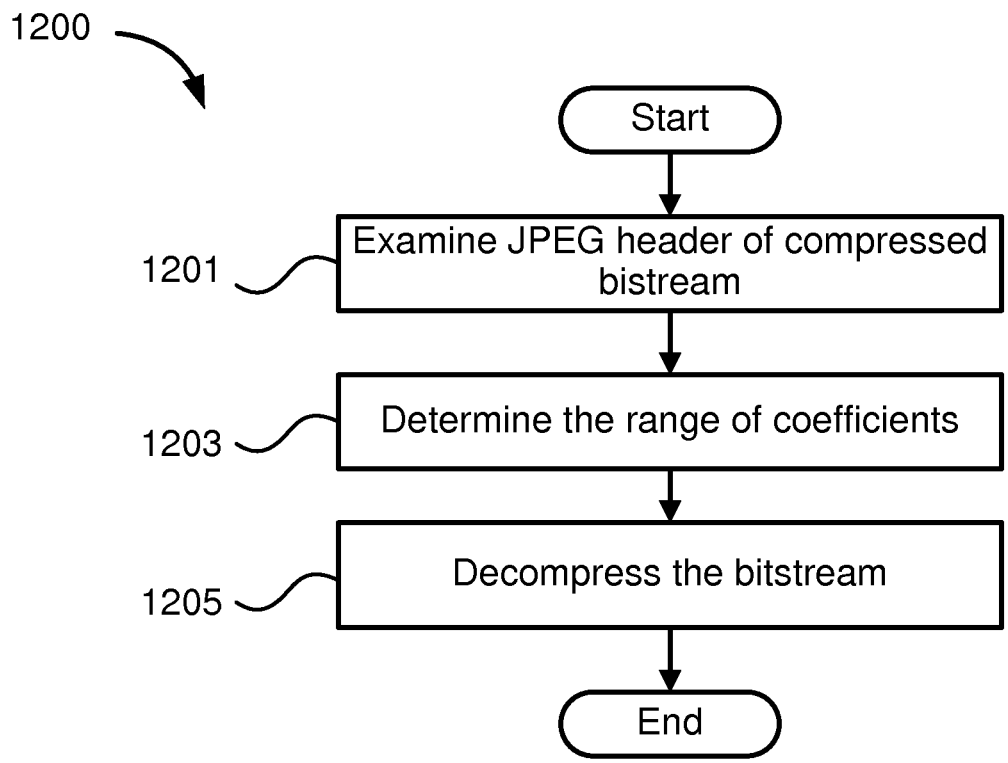
FIG. 12 is a flow diagram showing a method of transcoding a JPEG compressed bitstream.

For the purposes of the quality factor arrangement, a method 1200 of transcoding a JPEG compressed bitstream will now be described with reference to FIG. 12. The method 1200 may be implemented as software resident in the memory 180 and being controlled in its execution by the processor 185 of the printer 115.

The method 1200 begins at examining step 1201, where the bitmap decompressor module 304, under execution of the processor 185, accepts a JPEG compressed bitstream from the bitmap manager 301. A JPEG header is examined by the processor 185 and the quantisation tables used for each colour channel are extracted and saved to a suitable buffer, for example, configured within the memory 180. In the quality factor arrangement, the quantisation tables encoded in the JPEG header are examined and compared to an 'ideal' quantisation table (equivalent to a JPEG quality factor of 100) so that an effective quantisation scaling factor, Q, may be applied to Equation 3 above.

As an example, Q may be determined by calculating the one to one ratio for each of the values in the quantisation table associated with the encoded JPEG bitmap to that of the ideal quantisation table. This example requires that the JPEG quality factor is applied uniformly across all values in the quantisation table associated with the encoded JPEG. For example, if the quantisation table associated with the encoded JPEG bitmap is equivalent to the ideal quantisation table then Q=1. Yet another example is where the JPEG quality factor is such that Q=1.5. A Q>1 indicates that the JPEG encoded bitmap has already undergone some reduction in quality and should therefore be treated differently to a JPEG encoded image that has been encoded at a higher quality. Other suitable methods to determine Q may equally be used.

The method 1200 continues at determining step 1203, where the range of AC coefficients to be stored in each scan partition are determined using Equation (3). Equation (3) for this arrangement is written as:

$$\rho_i = \left\{ QZ \frac{\Lambda e_i - \Lambda s_i + 1}{64} \right\} \tag{5}$$

where $\Lambda s_i$ and $\Lambda e_i$ represent the AC coefficient start and end indices for the ith partition for the ideal AC coefficient scan partition set, Z is calculated from equation (2) and { } rounds the value to the nearest integer. A Q>1 has the effect of increasing the range of DCT coefficients in a given scan partition. Accordingly, the total number of partitions assigned to the bitmap is decreased. At the next step 1205, the bitmap decompressor module 304, under execution of the processor 185, decompresses the bitstream to recover each of 8×8 blocks of quantised DCT coefficients. These blocks may be passed by the bitmap decompressor module 304 to the bitmap compressor module 302. However, in the quality factor arrangement, the bitmap compressor module 302 applies the process 800 substituting Equation (5) for equation (3) at step 803.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method, executed in an image processing system, of encoding spectral coefficients of an image, said method comprising:
   a processor of the system executing the steps of:
   receiving the spectral coefficients of the image, the spectral coefficients being quantized;
   receiving a scaling factor to be applied to the image for rendering a bitmap of the image after decoding;
   partitioning the received spectral coefficients into a plurality of groupings, a number of coefficients in each of the groupings being determined based on the scaling factor for rendering the bitmap of the image, wherein the number of coefficients in each of the groupings increases as the scaling factor becomes larger;
   encoding the spectral coefficients in each of the plurality of groupings; and
   transmitting the plurality of groupings of encoded spectral coefficients to a decoder.

2. The method according to claim 1, wherein the scaling factor is determined from a page description language (PDL) representation of the image.

3. The method according to claim 1, wherein lossy compression is used in said encoding.

4. The method according to claim 1, wherein the encoded spectral coefficients are stored in one or more partitions in a memory.

5. The method according to claim 1, further comprising determining a number of the plurality of groupings of encoded spectral coefficients to apply to rendered bitmaps, upon a memory being exhausted.

6. The method according to claim 5, further comprising deleting encoded spectral coefficients from the rendered bitmaps up to the determined number of groupings, to recover at least a portion of the memory.

7. The method according to claim 6, wherein the deleted spectral coefficients are associated with at least one least visually perceptible element of the image.

8. The method according to claim 1, wherein the method is implemented by a printer.

9. The method according to claim 1, wherein the decoder is configured within a printer.

10. An apparatus for encoding spectral coefficients of an image, said apparatus comprising:
    at least one processor;
    first receiving means for receiving the spectral coefficients of the image, the spectral coefficients being quantized;
    second receiving means for receiving a scaling factor to be applied to the image for rendering a bitmap of the image after decoding;
    partitioning means for partitioning the received spectral coefficients into a plurality of groupings, a number of coefficients in each of the grouping being determined based on the scaling factor for rendering the bitmap of the image, wherein the number of coefficients in each of the groupings increases as the scaling factor becomes larger;
    encoding means for encoding the spectral coefficients in each of the plurality of groupings; and
    transmitting means for transmitting the plurality of groupings of encoded spectral coefficients to a decoder.

11. A system for encoding spectral coefficients of an image, said system comprising:
    a memory for storing data and a computer program; and
    a processor coupled to said memory executing said computer program, said computer program comprising instructions for:
    receiving the spectral coefficients of the image, the spectral coefficients being quantized;
    receiving a scaling factor to be applied to the image for rendering a bitmap of the image after decoding;
    partitioning the received spectral coefficients into a plurality of groupings, a number of coefficients in each of the groupings being determined based on the scaling factor for rendering the bitmap of the image, wherein the number of coefficients in each of the groupings increases as the scaling factor becomes larger; and
    encoding the spectral coefficients in each of the plurality of groupings; and
    transmitting the plurality of groupings of encoded spectral coefficients to a decoder.

12. A non-transitory computer readable medium, having a program recorded thereon, where the program is configured to make a computer execute a procedure to encode spectral coefficients of an image, said program comprising:
    code for receiving the spectral coefficients of the image, the spectral coefficients being quantized;
    code for receiving a scaling factor to be applied to the image for rendering a bitmap of the image after decoding;
    code for partitioning the received spectral coefficients into a plurality of groupings, a number of coefficients in each of the groupings being determined based on the scaling factor for rendering a bitmap of the image, wherein the number of coefficients in each of the groupings increases as the scaling factor becomes larger;
    code for encoding the spectral coefficients in each of the plurality of groupings; and
    code for transmitting the plurality of groupings of encoded spectral coefficients to a decoder.

* * * * *